United States Patent
Wang et al.

(10) Patent No.: US 11,656,674 B2
(45) Date of Patent: May 23, 2023

(54) POWER CONSUMPTION REDUCTION CIRCUIT FOR GPUS IN SERVER, AND SERVER

(71) Applicant: SUZHOU INSPUR INTELLIGENT TECHNOLOGY CO., LTD., Jiangsu (CN)

(72) Inventors: Peng Wang, Jiangsu (CN); Shichao Cheng, Jiangsu (CN); Longling Sun, Jiangsu (CN); Wenyu Liu, Jiangsu (CN); Mingyang Ye, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/791,310

(22) PCT Filed: Sep. 24, 2020

(86) PCT No.: PCT/CN2020/117277
§ 371 (c)(1),
(2) Date: Jul. 7, 2022

(87) PCT Pub. No.: WO2021/208360
PCT Pub. Date: Oct. 21, 2021

(65) Prior Publication Data
US 2023/0035371 A1    Feb. 2, 2023

(30) Foreign Application Priority Data

Apr. 16, 2020   (CN) .......................... 202010300844.3

(51) Int. Cl.
*G06F 1/3234*   (2019.01)
*G06T 1/20*   (2006.01)
(Continued)

(52) U.S. Cl.
CPC .............. *G06F 1/3278* (2013.01); *G06T 1/20* (2013.01); *G06F 1/26* (2013.01); *G06F 1/324* (2013.01); *G06F 1/3206* (2013.01); *Y02D 10/00* (2018.01)

(58) Field of Classification Search
CPC .......... G06F 1/26; G06F 1/3206; G06F 1/324; Y02D 10/00
See application file for complete search history.

(56) References Cited

U.S. PATENT DOCUMENTS

2014/0380073 A1* 12/2014 Yu .......................... G06F 1/324
                                                                713/322
2017/0185131 A1* 6/2017 Chen ...................... G06F 1/324
(Continued)

FOREIGN PATENT DOCUMENTS

CN        104238719 A    12/2014
CN        104798005 A    7/2015
(Continued)

OTHER PUBLICATIONS

International Search Report of corresponding PCT application (PCT/CN2020/117277), dated Jan. 15, 2021, 6 pages.
(Continued)

*Primary Examiner* — Terrell S Johnson
(74) *Attorney, Agent, or Firm* — Cooper Legal Group, LLC

(57) ABSTRACT

Disclosed are a power consumption reduction circuit for Graphics Processing Units (GPUs) in a server and a server. The power consumption reduction circuit includes a frequency reduction control chip. The frequency reduction control chip, after receiving an overpower alarm signal generated by a Power Supply Unit (PSU), generates a frequency reduction control signal to a Power Break (PWR-BRK) pin of each GPU so as to start a frequency reduction operation of each GPU. It can be seen that, in the present
(Continued)

application, an underlying hardware circuit is directly used for implementation with relatively quick responses and without intervention of an operating system, whereby the whole frequency reduction operation of the GPU may be completed within 5 ms, and the PSU is prevented from triggering overpower protection within relatively short time. Therefore, loss of service data of a user caused by an exceptional power failure of the server is avoided.

15 Claims, 2 Drawing Sheets

(51) Int. Cl.
  *G06F 1/3206* (2019.01)
  *G06F 1/26* (2006.01)
  *G06F 1/324* (2019.01)

(56) References Cited

U.S. PATENT DOCUMENTS

| | | | |
|---|---|---|---|
| 2019/0265776 A1* | 8/2019 | Montero | G06F 1/3212 |
| 2020/0033926 A1* | 1/2020 | Maddukuri | G06F 1/28 |

FOREIGN PATENT DOCUMENTS

| | | |
|---|---|---|
| CN | 106598814 A | 4/2017 |
| CN | 107450702 A | 12/2017 |
| CN | 107831883 A | 3/2018 |
| CN | 107844187 A | 3/2018 |
| CN | 107908583 A | 4/2018 |
| CN | 108304295 A | 7/2018 |
| CN | 109960632 A | 7/2019 |
| CN | 110147155 A | 8/2019 |
| CN | 110597684 A | 12/2019 |
| CN | 210111685 U | 2/2020 |
| CN | 111475009 A | 7/2020 |

OTHER PUBLICATIONS

Written Opinion of International Searching Authority of corresponding PCT application (PCT/CN2020/117277), dated Jan. 15, 2021, 4 pages.

First Office Action of corresponding CN priority application (CN202010300844.3), dated May 28, 2021, 12 pages.

* cited by examiner

POWER CONSUMPTION REDUCTION CIRCUIT FOR GPUS IN SERVER, AND SERVER

This application claims priority to Chinese Patent Application No. 202010300844.3, filed on Apr. 16, 2020, in China National Intellectual Property Administration and entitled "Power Consumption Reduction Circuit for GPUs in Server, and Server", the contents of which are hereby incorporated by reference in its entirety.

FIELD

The present disclosure relates to the field of servers, and particularly to a power consumption reduction circuit for Graphics Processing Units (GPUs) in a server, and a server.

BACKGROUND

With the application of big data, Internet of things, and other technologies, data has grown exponentially in recent years. As a result, a conventional server taking a Central Processing Unit (CPU) as a data processing core only is unable to meet a data processing requirement, and a server with GPUs emerges. Currently, with the constant improvement of computing power of the GPU, power consumption thereof has also increased, which, together with the existence of hardware in the server, such as the CPU, internal memory, and a hard disk, may make overall power consumption of the server exceed an upper limit supported by a Power Supply Unit (PSU) powering the server.

In the prior art, a server usually limits overall power consumption of the server by use of a power capping method to ensure that the overall power consumption of the server is lower than an upper limit supported by a PSU. Specifically, the power capping method is as follows: a total power consumption threshold is set in advance for the server, whether the overall power consumption of the server exceeds the set total power consumption threshold is monitored during the operation of the server, and if YES, a power consumption reduction strategy is started, namely a frequency reduction instruction is transmitted to a GPU in the server through a Peripheral Component Interconnect Express (PCIE) bus such that the GPU limits its own operating frequency after receiving the frequency reduction instruction. However, the power capping method is completed at an operating system level with a relatively long time delay (about 50 ms) during which it is very possible that the PSU has triggered overpower protection due to overpower output (the PSU may trigger overpower protection in case of overpower output for a period of time). This may cause an exceptional power failure of the server, thereby causing loss of service data of a user.

Therefore, how to provide a solution to the foregoing technical problem is a problem needed to be solved by those skilled in the art at present.

SUMMARY

An objective of the present disclosure is to provide a power consumption reduction circuit for GPUs in a server, and a server. An underlying hardware circuit is directly used for implementation with relatively quick responses and without intervention of an operating system, whereby a whole frequency reduction operation of a GPU may be completed within 5 ms, and a PSU is prevented from triggering overpower protection within relatively short time. Therefore, loss of service data of a user caused by an exceptional power failure of a server is avoided.

In order to solve the foregoing technical problem, the present disclosure provides a power consumption reduction circuit for GPUs in a server, including:

a frequency reduction control chip connected with a PSU in the server and a Power Break (PWRBRK) pin of each GPU in the server respectively, configured to, after receiving an overpower alarm signal generated by the PSU, generate a frequency reduction control signal to the PWRBRK pin of each GPU so as to start a frequency reduction operation of each GPU.

Preferably, the power consumption reduction circuit further includes:

a switch chip connected with an output end of the frequency reduction control chip and the PWRBRK pin of each GPU respectively; and a control circuit connected with a channel control terminal of the switch chip, configured to determine a target GPU in need of frequency reduction processing from each GPU according to a comparison relationship between overall power consumption of the server and rated power of the PSU, and control the switch chip to enable a transmission channel between the frequency reduction control chip and the target GPU so as to output the frequency reduction control signal to the PWRBRK pin of the target GPU to start the frequency reduction operation of the target GPU.

Preferably, the control circuit includes:

an Input/Output (I/O) extended chip connected with the channel control terminal of the switch chip; and a controller connected with the I/O extended chip, configured to determine the target GPU in need of frequency reduction processing from each GPU according to the comparison relationship between the overall power consumption of the server and the rated power of the PSU, and control the switch chip through the I/O extended chip to enable the transmission channel between the frequency reduction control chip and the target GPU so as to output the frequency reduction control signal to the PWRBRK pin of the target GPU.

Preferably, the controller is specifically configured to:

in response to $P2+m \times P3 > P1$, traverse a number n of target GPUs in need of frequency reduction processing in the server from $n=1$ to determine a first integer k satisfying a relational expression $P2+P3/N \times n+(m-n) \times P3 \geq P1 \geq P2+P3/N \times (n-1)+(m-n+1) \times P3$, wherein P1 represents the rated power of the PSU, P2 represents total power consumption of other components in the server except the GPUs, P3 represents power consumption of a single GPU, m represents a total number of the GPUs in the server, and N represents a preset parameter;

in response to $k \geq m$, control the switch chip through the I/O extended chip to enable the transmission channel between the frequency reduction control chip and k pieces of GPUs so as to output the frequency reduction control signal to the PWRBRK pins of the k pieces of GPUs; and in response to $k > m$, control the switch chip through the I/O extended chip to enable the transmission channel between the frequency reduction control chip and m pieces of GPUs so as to output the frequency reduction control signal to the PWRBRK pins of the m pieces of GPUs.

Preferably, the controller is connected with the PSU through a Power Management Bus (PMBus).

The controller is further configured to reduce an overpower threshold of the PSU in response to $k \geq m$.

Preferably, the controller is specifically configured to, in response to $k \geq m$, modify the overpower threshold of the PSU according to the overpower threshold $P=P2+P3/N\times k+(m-k)\times P3$ so as to reduce the overpower threshold of the PSU.

Preferably, the controller is further configured to, in response to k>m, give an alarm representing that the overall power consumption of the server after frequency reduction still exceeds the rated power of the PSU.

Preferably, the frequency reduction control chip is specifically a Complex Programmable Logic Device (CPLD) in the server, and the controller is specifically a Baseboard Manager Controller (BMC) in the server.

In order to solve the foregoing technical problem, the present disclosure also provides a server, including a PSU and GPUs and further including any above-mentioned power consumption reduction circuit for GPUs in a server.

Preferably, the PSU is specifically a PSU 1+1 redundancy architecture.

The present disclosure provides a power consumption reduction circuit for GPUs in a server, including a frequency reduction control chip. The frequency reduction control chip, after receiving an overpower alarm signal generated by a PSU, generates a frequency reduction control signal to a PWRBRK pin of each GPU so as to start a frequency reduction operation of each GPU. It can be seen that, in the present application, an underlying hardware circuit is directly used for implementation with relatively quick responses and without intervention of an operating system, whereby the whole frequency reduction operation of the GPU may be completed within 5 ms, and the PSU is prevented from triggering overpower protection within relatively short time. Therefore, loss of service data of a user caused by an exceptional power failure of the server is avoided.

The present disclosure also provides a server with the same beneficial effects as the power consumption reduction circuit.

BRIEF DESCRIPTION OF THE DRAWINGS

In order to describe the technical solutions in embodiments of the present disclosure more clearly, the drawings required to be used in the prior art and the embodiments will be briefly introduced below. Apparently, the drawings in the description below are only some embodiments of the present disclosure. Those ordinarily skilled in the art may further obtain other drawings according to these drawings without creative work.

DETAILED DESCRIPTION

A core of the present disclosure is to provide a power consumption reduction circuit for GPUs in a server, and a server. An underlying hardware circuit is directly used for implementation with relatively quick responses and without intervention of an operating system, whereby a whole frequency reduction operation of a GPU may be completed within 5 ms, and a PSU is prevented from triggering overpower protection within relatively short time. Therefore, loss of service data of a user caused by an exceptional power failure of a server is avoided.

In order to make the objective, technical solutions, and advantages of the embodiments of the present disclosure clearer, the technical solutions in the embodiments of the present disclosure will be described clearly and completely below in combination with the drawings in the embodiments of the present disclosure. Clearly, the described embodiments are not all but only part of embodiments of the present disclosure. All other embodiments obtained by those ordinarily skilled in the art based on the embodiments in the present disclosure without creative work shall fall within the scope of protection of the present disclosure.

Figure 1:
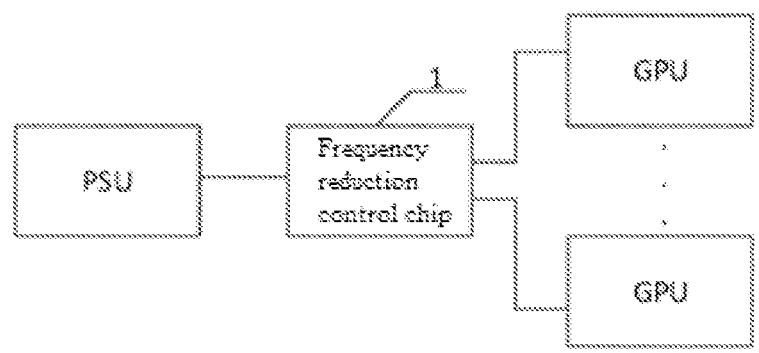
FIG. 1 is a schematic structural diagram of a power consumption reduction circuit for GPUs in a server according to an embodiment of the present disclosure.

Referring to FIG. 1, FIG. 1 is a schematic structural diagram of a power consumption reduction circuit for GPUs in a server according to an embodiment of the present disclosure.

The power consumption reduction circuit for GPUs in a server includes:

a frequency reduction control chip 1 connected with a PSU in a server and a PWRBRK pin of each GPU in the server respectively, configured to, after receiving an overpower alarm signal generated by the PSU, generate a frequency reduction control signal to the PWRBRK pin of each GPU so as to start a frequency reduction operation of each GPU.

Specifically, the power consumption reduction circuit for GPUs in a server in the present application includes a frequency reduction control chip 1 of which a working principle is as follows.

A PSU of a server generates and sends an overpower alarm signal to the frequency reduction control chip 1 when detecting that its own output power is greater than a preset overpower threshold (which may adopt rated power of the PSU in the present application). The frequency reduction control chip 1 generates and sends a frequency reduction control signal to a PWRBRK pin (an abbreviation of a power break pin, i.e., a power control pin) of each GPU in the server after receiving the overpower alarm signal. The PWRBRK pin of each GPU may reduce power consumption to 1/N (N is a positive parameter, and N is valued dependent on a power consumption reduction strategy set in the GPU to be, for example, 4) of the present power consumption after receiving the frequency reduction control signal, thereby reducing overall power consumption of the server relatively fast to a range supportable by the PSU to further prevent a power failure of a system.

In addition, the PSU in the present application may use a PSU 1+1 redundancy architecture. In such case, the frequency reduction control chip 1 is connected with two PSUs, and is configured to generate a frequency reduction control chip after receiving an overpower alarm signal generated by any one of the PSUs. The GPU in the present application may make a quick frequency reduction response, whereby the present application may meet a design requirement of a server product with the PSU 1+1 redundancy architecture.

The present disclosure provides a power consumption reduction circuit for GPUs in a server, including a frequency reduction control chip. The frequency reduction control chip, after receiving an overpower alarm signal generated by a PSU, generates a frequency reduction control signal to a PWRBRK pin of each GPU so as to start a frequency reduction operation of each GPU. It can be seen that, in the present application, an underlying hardware circuit is directly used for implementation with relatively quick responses and without intervention of an operating system, whereby the whole frequency reduction operation of the GPU may be completed within 5 ms, and the PSU is prevented from triggering overpower protection within relatively short time. Therefore, loss of service data of a user caused by an exceptional power failure of the server is avoided.

Figure 2:
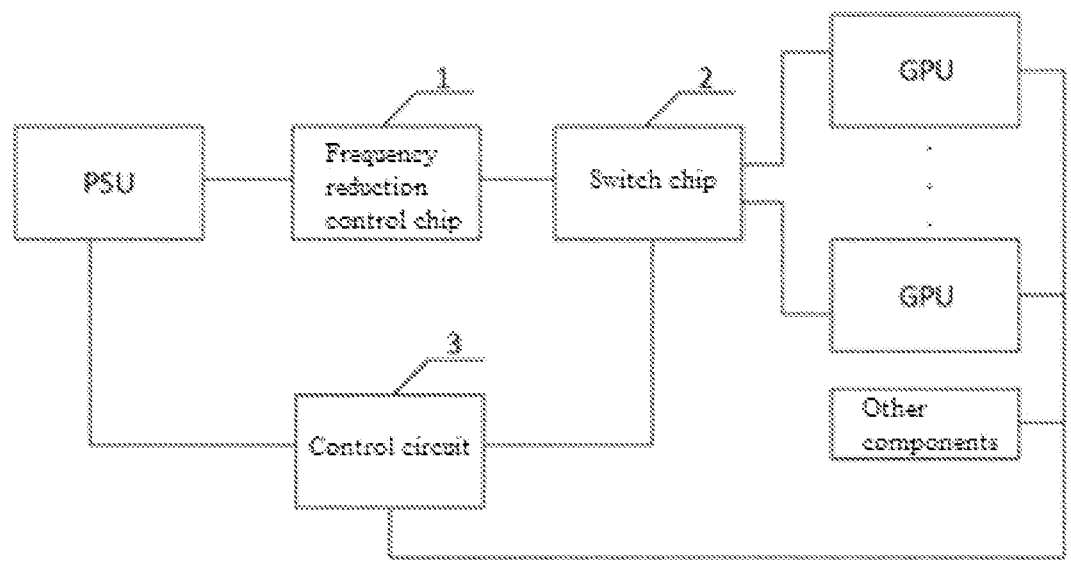
FIG. 2 is a specific schematic structural diagram of a power consumption reduction circuit for GPUs in a server according to an embodiment of the present disclosure.

Based on the above-mentioned embodiment, referring to FIG. 2, FIG. 2 is a specific schematic structural diagram of a power consumption reduction circuit for GPUs in a server according to an embodiment of the present disclosure.

As an optional embodiment, the power consumption reduction circuit further includes:

a switch chip 2 connected with an output end of the frequency reduction control chip 1 and the PWRBRK pin of each GPU respectively; and a control circuit 3 connected with a channel control terminal of the switch chip 2, configured to determine a target GPU in need of frequency reduction processing from each GPU according to a comparison relationship between overall power consumption of the server and rated power of the PSU, and control the switch chip 2 to enable a transmission channel between the frequency reduction control chip 1 and the target GPU so as to output the frequency reduction control signal to the PWRBRK pin of the target GPU to start the frequency reduction operation of the target GPU.

Specifically, the power consumption reduction circuit of the present application further includes a switch chip 2 (which may adopt a Field Effect Transistor (FET) switch chip) and a control circuit 3 of which a working principle is as follows.

The switch chip 2 is arranged on a connecting circuit between an output end of the frequency reduction control chip 1 and the PWRBRK pin of each GPU, and is configured to control the circuit between the output end of the frequency reduction control chip 1 and the PWRBRK pin of each GPU to be switched on and off individually. It can be understood that, when the circuit between the output end of the frequency reduction control chip 1 and the PWRBRK pin of a GPU is switched on, the frequency reduction control signal generated by the frequency reduction control chip 1 may be output to the PWRBRK pin of the GPU, and when the circuit between the output end of the frequency reduction control chip 1 and the PWRBRK pin of a GPU is switched off, the frequency reduction control signal generated by the frequency reduction control 1 may not be output to the PWRBRK pin of the GPU.

Based on this, the control circuit 3 obtains overall power consumption of the server and rated power of the PSU respectively, and then determines a target GPU in need of frequency reduction processing from all GPUs in the server according to the comparison relationship between the overall power consumption of the server and the rated power of the PSU, for a purpose of controlling the switch chip 2 to switch on the circuit between the output end of the frequency reduction control chip 1 and the PWRBRK pin of the target GPU, namely enabling the transmission channel between the frequency reduction control chip 1 and the target GPU, thereby outputting the frequency reduction control signal generated by the frequency reduction control chip 1 to the PWRBRK pin of the target GPU to start the frequency reduction operation of the target GPU.

As an optional embodiment, the control circuit 3 includes:

an I/O extended chip connected with the channel control terminal of the switch chip 2; and a controller connected with the I/O extended chip, configured to determine the target GPU in need of frequency reduction processing from each GPU according to the comparison relationship between the overall power consumption of the server and the rated power of the PSU, and control the switch chip 2 through the I/O extended chip to enable the transmission channel between the frequency reduction control chip 1 and the target GPU so as to output the frequency reduction control signal to the PWRBRK pin of the target GPU.

Specifically, the control circuit 3 of the present application includes an I/O extended chip (which may adopt a PCA9555 chip) and a controller of which a working principle is as follows.

Figure 3:
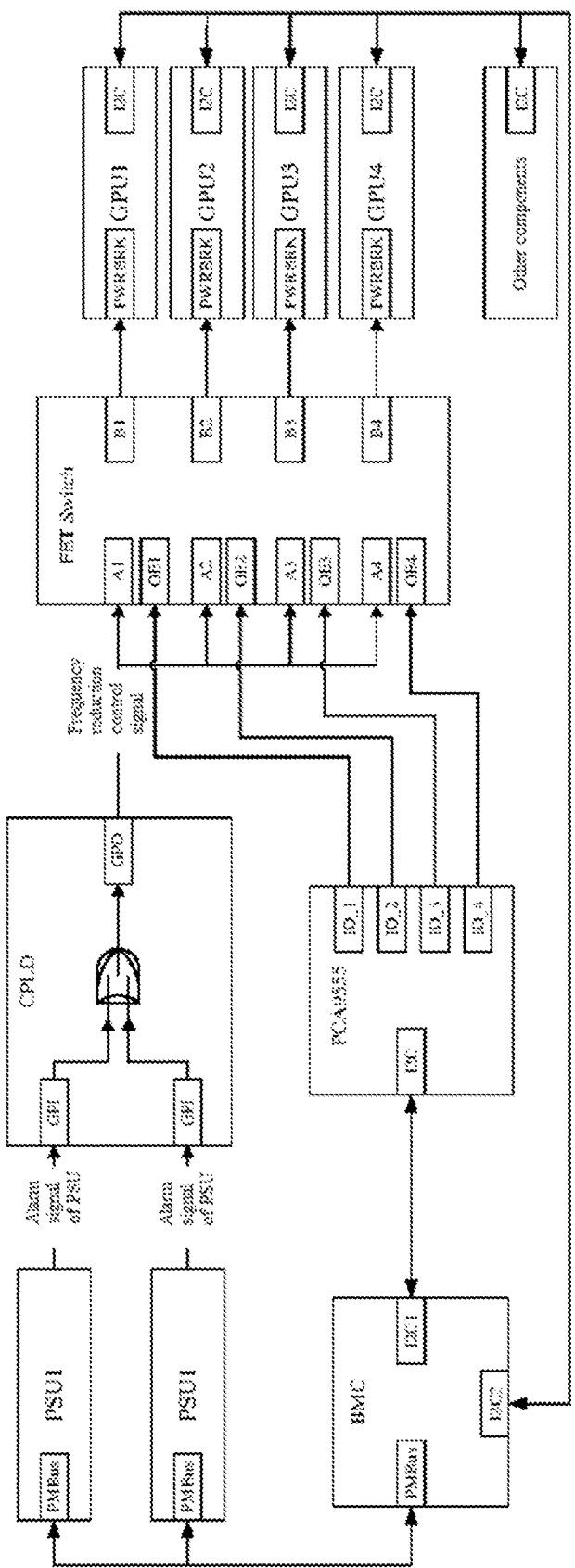
FIG. 3 is a specific schematic device diagram of a power consumption reduction circuit for GPUs in a server according to an embodiment of the present disclosure.

The number of the transmission channels of the switch chip 2 needs to be more than or equal to the total number of the GPUs in the server (as shown in FIG. 3, there are four GPUs in the server, and no particular limits are made thereto in the present application). Channel control terminals (OE1 to OE4 shown in FIG. 3) configured to control the transmission channels to be enabled or disabled are arranged on the switch chip 2. Considering the limited number of I/O ports of the controller, the controller of the present application is connected with the channel control terminals of the switch chip 2 individually through the I/O extended chip so as to control an output signal of the I/O extended chip to control the transmission channels of the switch chip 2 to be enabled or disabled.

As an alternative embodiment, the controller is specifically configured to:

in case of $P2+m \times P3 > P1$, traverse a number n of target GPUs in need of frequency reduction processing in the server from $n=1$ to determine a first integer k satisfying a relational expression $P2+P3/N \times n+(m-n) \times P3 \geq P1 \geq P2+P3/N \times (n-1)+(m-n+1) \times P3$, wherein P1 represents the rated power of the PSU, P2 represents total power consumption of other components in the server except the GPUs, P3 represents power consumption of a single GPU, m represents a total number of the GPUs in the server, and N represents a preset parameter;

in case of $k \geq m$, control the switch chip 2 through the I/O extended chip to enable the transmission channels between the frequency reduction control chip 1 and k pieces of GPUs so as to output the frequency reduction control signal to the PWRBRK pins of the k pieces of GPUs; and in case of $k > m$, control the switch chip 2 through the I/O extended chip to enable the transmission channels between the frequency reduction control chip 1 and m pieces of GPUs so as to output the frequency reduction control signal to the PWRBRK pins of the m pieces of GPUs.

Specifically, it is set that the rated power of the PSU is P1, total power consumption of other components in the server except the GPUs is P2, power consumption of a single GPU is P3, and a total number of the GPUs in the server is m.

(1) In case of $P2+m \times P3 \geq P1$, it indicates that the overall power consumption of the server does not exceed an upper limit supportable by the PSU, and the system needs not to execute a frequency reduction strategy.

(2) In case of $P2+m \times P3 > P1$, it indicates that the overall power consumption of the server exceeds the upper limit supportable by the PSU, and the system needs to execute the frequency reduction strategy. The number of target GPUs in need of frequency reduction processing in the system is set to n, and n is traversed from $n=1$ to find a first integer k satisfying the following relational expression:

$$P2+P3/4 \times n+(m-n) \times P3 \geq P1 \geq P2+P3/4 \times (n-1)+(m-n+1) \times P3.$$

In case of k≥m, it indicates that frequency reduction processing is needed to be performed on k pieces of GPUs in the system so as to make the overall power consumption of the server after frequency reduction lower than the rated power of the PSU. In such case, the controller controls the switch chip 2 through the I/O extended chip to enable the transmission channels between the frequency reduction control chip 1 and the k pieces of GPUs so as to output the frequency reduction control signal generated by the frequency reduction control chip 1 to the PWRBRK pins of the k pieces of GPUs.

In case of k>m, the controller controls the switch chip 2 through the I/O extended chip to enable the transmission channels between the frequency reduction control chip 1 and all the GPUs so as to output the frequency reduction control signal generated by the frequency reduction control chip 1 to the PWRBRK pins of all the GPUs.

As an alternative embodiment, the controller is connected with the PSU through a PMBus.

The controller is further configured to reduce an overpower threshold of the PSU in case of k≥m.

Further, the controller is connected with the PSU through the PMBus, for a purpose of reducing an overpower threshold of the PSU through the PMBus in case of k≥m, thereby avoiding the PSU being overloaded more effectively before the frequency reduction operation of the GPU works.

As an alternative embodiment, the controller is specifically configured to, in case of k≥m, modify the overpower threshold of the PSU according to the overpower threshold P=P2+P3/N×k+(m−k)×P3 so as to reduce the overpower threshold of the PSU.

Specifically, in case of k≥m, the controller may modify the overpower threshold of the PSU according to the overpower threshold P=P2+P3/N×k+(m−k)×P3, thereby reducing the overpower threshold of the PSU relatively reasonably.

As an alternative embodiment, the controller is further configured to, in case of k>m, give an alarm representing that the overall power consumption of the server after frequency reduction still exceeds the rated power of the PSU.

Further, considering that, in case of k>m, the overall power consumption of the server after frequency reduction may still exceed the rated power of the PSU even though frequency reduction processing is performed on all of the m pieces of GPUs in the system, the controller further gives an alarm representing that the overall power consumption of the server after frequency reduction still exceeds the rated power of the PSU in case of k>m. For example, a web interface of a BMC is controlled to make an alarm prompt for the user to view.

As an alternative embodiment, the frequency reduction control chip 1 is specifically a CPLD in the server, and the controller is specifically a BMC in the server.

Specifically, the frequency reduction control chip 1 of the present application may be implemented by a CPLD in the server, and the controller may be implemented by a BMC in the server, as shown in FIG. 3. No additional device is needed, the cost is reduced, and the structure is simplified.

More specifically, the BMC may read the rated power of the PSU through the PMBus, read maximum power consumption of the GPUs and the other components in the system through an Inter-Integrated Circuit (I²C) bus, and then obtain the number of GPUs in need of frequency reduction control and a reset value of the overpower threshold of the PSU according to a relational expression P2+P3/4×n+(m−n)×P3≥P1≥P2+P3/4×(n−1)+(m−n+1)×P3.

The present application also provides a server, including a PSU and GPUs and further including any above-mentioned power consumption reduction circuit for GPUs in a server.

As an alternative embodiment, the PSU is specifically a PSU 1+1 redundancy architecture.

Introductions about the server provided in the present application refer to the embodiment of the power consumption reduction circuit, and elaborations are omitted in the present application.

It is also to be noted that relational terms in the specification, such as first and second, are used only to distinguish an entity or operation from another entity or operation and does not necessarily require or imply the existence of any practical relation or sequence between these entities or operations. Moreover, terms "include" and "contain" or any other variation thereof is intended to cover nonexclusive inclusions, so that a process, method, object, or device including a series of elements not only includes those elements but also includes other elements which are not clearly listed, or further includes elements intrinsic to the process, the method, the object, or the device. With no more restrictions, an element defined by statement "including a/an . . . " does not exclude the existence of the same other elements in a process, method, object, or device including the element.

The disclosed embodiments are described above to enable those skilled in the art to implement or use the present disclosure. Various modifications to these embodiments are apparent to those skilled in the art. The general principle defined herein may be implemented in other embodiments without departing from the spirit or scope of the present disclosure. Therefore, the present disclosure will not be limited to these embodiments shown herein but is consistent with the largest scope consistent with the principles and novel characteristics disclosed herein.

The invention claimed is:

1. A power consumption reduction circuit for Graphics Processing Units (GPUs) in a server, comprising:
   a frequency reduction control chip connected with a Power Supply Unit (PSU) in the server and a Power Break (PWRBRK) pin of each of the GPUs in the server respectively, wherein the frequency reduction control chip is configured to, after receiving an overpower alarm signal generated by the PSU, generate a frequency reduction control signal to the PWRBRK pin of each of the GPUs so as to start a frequency reduction operation of each of the GPUs;
   a switch chip connected with an output end of the frequency reduction control chip and the PWRBRK pin of each of the GPUs respectively; and
   a control circuit connected with a channel control terminal of the switch chip, wherein the control circuit is configured to determine a target GPU in need of frequency reduction processing from each of the GPUs according to a comparison relationship between overall power consumption of the server and rated power of the PSU, and control the switch chip to enable a transmission channel between the frequency reduction control chip and the target GPU so as to output the frequency reduction control signal to the PWRBRK pin of the target GPU to start the frequency reduction operation of the target GPU.

2. The power consumption reduction circuit for GPUs in the server according to claim 1, wherein the control circuit comprises:

an Input/Output (I/O) extended chip connected with the channel control terminal of the switch chip; and a controller connected with the I/O extended chip, wherein the controller is configured to determine the target GPU in need of the frequency reduction processing from each of the GPUs according to the comparison relationship between the overall power consumption of the server and the rated power of the PSU, and control the switch chip through the I/O extended chip to enable the transmission channel between the frequency reduction control chip and the target GPU so as to output the frequency reduction control signal to the PWRBRK pin of the target GPU.

3. The power consumption reduction circuit for GPUs in the server according to claim 2, wherein the controller is specifically configured to:

in response to P2+m×P3>P1, traverse a number n of target GPUs in need of the frequency reduction processing in the server from n=1 to determine a first integer k satisfying a relational expression P2+P3/N×n+(m−n)× P3≥P1≥P2+P3/N×(n−1)+(m−n+1)×P3, wherein P1 represents the rated power of the PSU, P2 represents total power consumption of other components in the server except the GPUs, P3 represents power consumption of a single GPU, m represents a total number of the GPUs in the server, and N represents a preset parameter;

in response to k>m, control the switch chip through the I/O extended chip to enable the transmission channels between the frequency reduction control chip and k pieces of the GPUs so as to output the frequency reduction control signal to the PWRBRK pins of the k pieces of the GPUs; and in response to k>m, control the switch chip through the I/O extended chip to enable the transmission channels between the frequency reduction control chip and m pieces of the GPUs so as to output the frequency reduction control signal to the PWRBRK pins of the m pieces of the GPUs.

4. The power consumption reduction circuit for GPUs in the server according to claim 3, wherein the controller is connected with the PSU through a Power Management Bus (PMBus); and the controller is further configured to reduce an overpower threshold of the PSU in response to k≥m.

5. The power consumption reduction circuit for GPUs in the server according to claim 4, wherein the controller is specifically configured to, in response to k>m, modify the overpower threshold of the PSU according to the overpower threshold P=P2+P3/N×k+(m−k)×P3 so as to reduce the overpower threshold of the PSU.

6. The power consumption reduction circuit for GPUs in the server according to claim 3, wherein the controller is further configured to, in response to k>m, give an alarm representing that the overall power consumption of the server after frequency reduction still exceeds the rated power of the PSU.

7. The power consumption reduction circuit for GPUs in the server according to claim 2, wherein the frequency reduction control chip is specifically a Complex Programmable Logic Device (CPLD) in the server, and the controller is specifically a Baseboard Manager Controller (BMC) in the server.

8. A server, comprising a Power Supply Unit (PSU) and Graphics Processing Units (GPUs) and further comprising a power consumption reduction circuit for the GPUs in the server, wherein the power consumption reduction circuit comprises a frequency reduction control chip connected with the PSU in the server and a Power Break (PWRBRK) pin of each of the GPUs in the server respectively, wherein the frequency reduction control chip is configured to, after receiving an overpower alarm signal generated by the PSU, generate a frequency reduction control signal to the PWRBRK pin of each of the GPUs so as to start a frequency reduction operation of each of the GPUs;

a switch chip connected with an output end of the frequency reduction control chip and the PWRBRK pin of each of the GPUs respectively; and a control circuit connected with a channel control terminal of the switch chip, wherein the control circuit is configured to determine a target GPU in need of frequency reduction processing from each of the GPUs according to a comparison relationship between overall power consumption of the server and rated power of the PSU, and control the switch chip to enable a transmission channel between the frequency reduction control chip and the target GPU so as to output the frequency reduction control signal to the PWRBRK pin of the target GPU to start the frequency reduction operation of the target GPU.

9. The server according to claim 8, wherein the PSU is specifically a PSU 1+1 redundancy architecture.

10. The server according to claim 8, wherein the power consumption reduction circuit further comprises:

an Input/Output (I/O) extended chip connected with the channel control terminal of the switch chip; and a controller connected with the I/O extended chip, wherein the controller is configured to determine the target GPU in need of the frequency reduction processing from each of the GPUs according to the comparison relationship between the overall power consumption of the server and the rated power of the PSU, and control the switch chip through the I/O extended chip to enable the transmission channel between the frequency reduction control chip and the target GPU so as to output the frequency reduction control signal to the PWRBRK pin of the target GPU.

11. The server according to claim 10, wherein the controller is specifically configured to:

in response to P2+m×P3>P1, traverse a number n of target GPUs in need of the frequency reduction processing in the server from n=1 to determine a first integer k satisfying a relational expression P2+P3/N×n+(m−n)× P3≥P1≥P2+P3/N×(n−1)+(m−n+1)×P3, wherein P1 represents the rated power of the PSU, P2 represents total power consumption of other components in the server except the GPUs, P3 represents power consumption of a single GPU, m represents a total number of the GPUs in the server, and N represents a preset parameter;

in response to k>m, control the switch chip through the I/O extended chip to enable the transmission channels between the frequency reduction control chip and k pieces of the GPUs so as to output the frequency reduction control signal to the PWRBRK pins of the k pieces of the GPUs; and in response to k>m, control the switch chip through the I/O extended chip to enable the transmission channels between the frequency reduction control chip and m pieces of the GPUs so as to output the frequency reduction control signal to the PWRBRK pins of the m pieces of the GPUs.

12. The server according to claim 11, wherein the controller is connected with the PSU through a Power Management Bus (PMBus); and the controller is further configured to reduce an overpower threshold of the PSU in response to k≥m.

13. The server according to claim 12, wherein the controller is specifically configured to, in response to k>m, modify the overpower threshold of the PSU according to the overpower threshold P=P2+P3/N×k+(m−k)×P3 so as to reduce the overpower threshold of the PSU.

14. The server according to claim 11, wherein the controller is further configured to, in response to k>m, give an alarm representing that the overall power consumption of the server after frequency reduction still exceeds the rated power of the PSU.

15. The server according to claim 10, wherein the frequency reduction control chip is specifically a Complex Programmable Logic Device (CPLD) in the server, and the controller is specifically a Baseboard Manager Controller (BMC) in the server.

* * * * *